United States Patent
Richardson

(10) Patent No.: US 9,521,813 B2
(45) Date of Patent: *Dec. 20, 2016

(54) SUBSURFACE IRRIGATION

(71) Applicant: Kenneth Owen Richardson, Santa Fe Springs, CA (US)

(72) Inventor: Kenneth Owen Richardson, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,886

(22) Filed: Jun. 3, 2015

(65) Prior Publication Data

US 2016/0014980 A1 Jan. 21, 2016

Related U.S. Application Data

(63) Continuation-in-part of application No. 14/295,863, filed on Jun. 4, 2014, now Pat. No. 9,119,353.

(51) Int. Cl.
*A01G 25/00* (2006.01)
*A01G 25/06* (2006.01)
*E02B 11/00* (2006.01)

(52) U.S. Cl.
CPC ............. *A01G 25/06* (2013.01); *E02B 11/005* (2013.01)

(58) Field of Classification Search
CPC ........ A01G 25/00; A01G 25/06; A01G 25/16; B05B 1/3006; B05B 11/0062
See application file for complete search history.

(56) References Cited

U.S. PATENT DOCUMENTS

| | | |
|---|---|---|
| 3,053,461 A | 9/1962 | Inglis |
| 3,807,430 A | 4/1974 | Keller |
| 3,814,377 A | 6/1974 | Todd |
| 3,908,694 A | 9/1975 | Spears |
| 4,177,947 A * | 12/1979 | Menzel ................ B05B 1/3026 138/45 |
| 4,402,631 A | 9/1983 | Rosenthal |
| 4,858,636 A | 8/1989 | Adkins |
| 4,863,101 A | 9/1989 | Pater et al. |
| 5,201,605 A | 4/1993 | Lang et al. |
| 5,465,905 A | 11/1995 | Elder |
| 5,984,202 A | 11/1999 | Byles |
| 2007/0274783 A1 | 11/2007 | Hibbard et al. |
| 2008/0041978 A1 | 2/2008 | Keren |

* cited by examiner

*Primary Examiner* — Benjamin Fiorello
(74) *Attorney, Agent, or Firm* — Kenneth L. Green; Averill & Green

(57) ABSTRACT

A subsurface emitter includes a piston valve both preventing water from draining from the system, and blocking the entry of roots and soil into the emitter body. A nozzle is present at one or both ends of a vertical tube. A piston is held in a normally closed position by a spring in the absence of water pressure, covering ports in the nozzle. When sufficient water pressure in provided, the spring is compressed and the nozzle uncovers the port providing a subsurface spray of water. The spray of water is sufficient to clear mineral deposits which otherwise may accumulate and block the port.

20 Claims, 4 Drawing Sheets

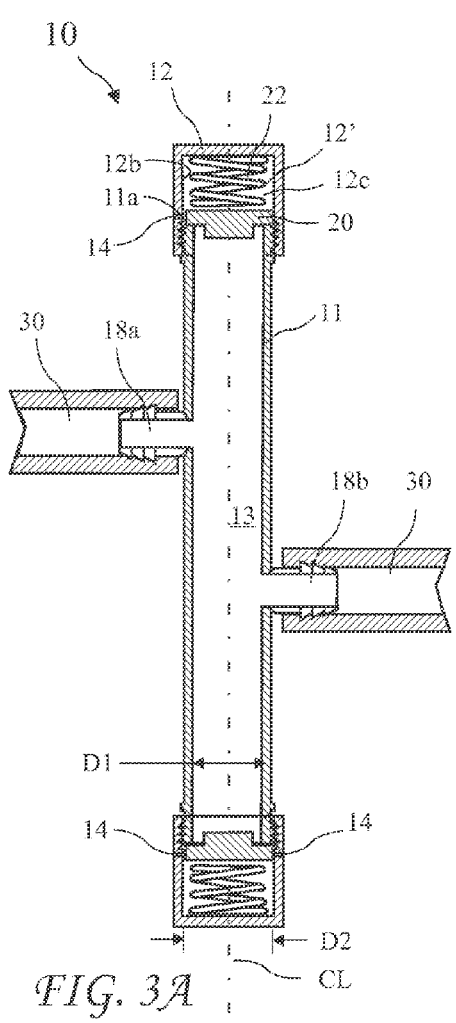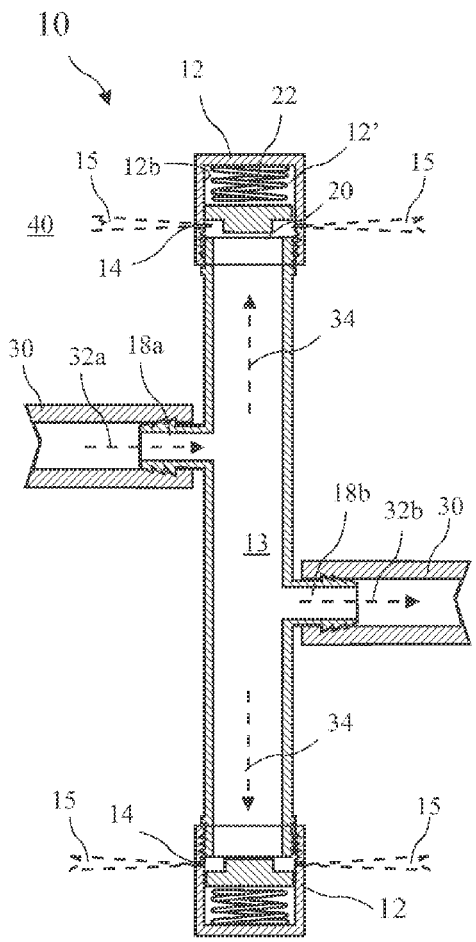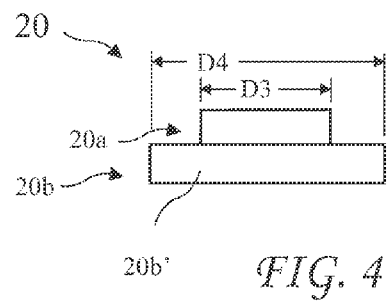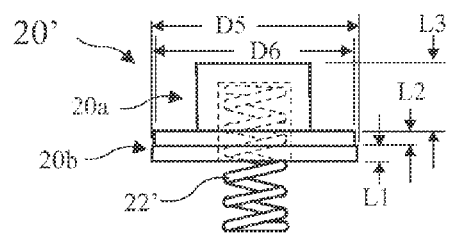

SUBSURFACE IRRIGATION

CROSS-REFERENCE TO RELATED APPLICATIONS

The present application is a Continuation In Part of U.S. patent application Ser. No. 14/295,863 filed Jun. 4, 2014, which application is incorporated in its entirety herein by reference.

BACKGROUND OF THE INVENTION

The present invention relates to subsurface watering and in particular to an improved subsurface emitter.

The advantages of subsurface watering, especially in dry climates, has long been recognized. Conventional watering using sprinklers is often less than 50 percent efficiency due to evaporation. Watering using sprinklers further germinates seeds from weeds resulting in undesirable growth in garden areas. Use of weed killer after the growth of weeds begins often accumulates chemicals in the soil preventing later grow of decorative plants. Releasing water under a ground surface prevents the evaporation of water potentially raising efficiency to close to 100 percent and leave the surface dry to reduce or prevent weeds.

BRIEF SUMMARY OF THE INVENTION

The present invention addresses the above and other needs by providing a subsurface emitter which includes a valve both preventing water from draining from the system, and blocking the entry of roots and soil into the emitter body. A nozzle is present at one or both ends of a vertical tube. A piston is held in a normally closed position by a spring in the absence of water pressure, covering ports in the nozzle. When sufficient water pressure in provided, the spring is compressed and the nozzle uncovers the port providing a subsurface spray of water. The spray of water is sufficient to clear mineral deposits which otherwise may accumulate and block the port.

In accordance with one aspect of the invention, there is provided a subsurface emitter including a water pressure actuated valve which covers the port in the nozzle. Known subsurface emitters have quickly failed because plant roots follow the water back to the source and into the nozzle. Because the piston blocks the port when the watering system is off, the roots cannot enter and block the port.

In accordance with another aspect of the invention, there is provided a subsurface emitter including a small port producing a high water velocity. The water velocity is sufficient to prevent an accumulation of minerals which otherwise may block the port.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A is a cross-sectional view of the subsurface emitter according to the present invention in a closed position taken along line 3-3 of FIG. 1B.

FIG. 3B is a cross-sectional view of the subsurface emitter according to the present invention in an open position taken along line 3-3 of FIG. 1B.

FIG. 4 is a detailed side view of a piston valve of the subsurface emitter according to the present invention.

FIG. 4A is a detailed side view of a second piston valve and spring of the subsurface emitter according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1B:
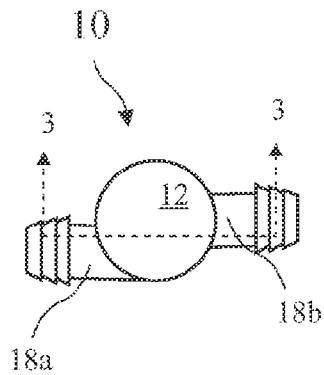
FIG. 1B is a top view of the subsurface emitter according to the present invention.
Figure 1A:
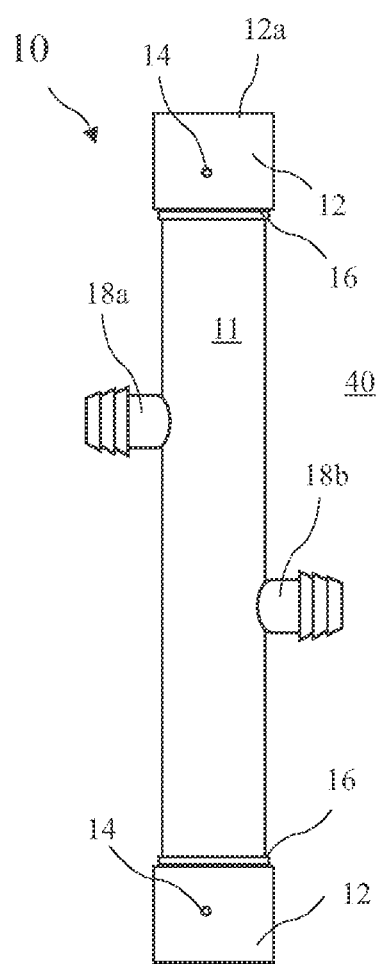
FIG. 1A is a side view of a subsurface emitter according to the present invention.

A side view of a subsurface emitter 10 according to the present invention is shown in FIG. 1 and a top view of the subsurface emitter 10 is shown in FIG. 1B. The emitter 10 includes a body 11, at least one nozzle and preferably two nozzles 12 attached to opposite ends of the body 11, and an inlet 18a and an outlet 18b on opposite sides of the body 11. The nozzles 12 include at least one port (or orifice) 14 for spraying water from the emitter 10. The inlet 18a may be offset to create turbulence inside the body to release dissolved air in the water. The emitter 10 resides in a subsurface area 40.

Figure 2:
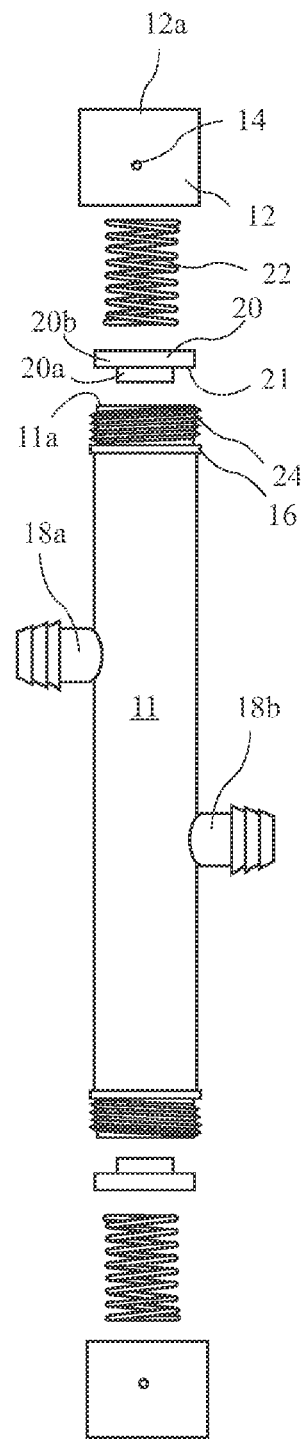
FIG. 2 is an exploded side view of the subsurface emitter according to the present invention.

An exploded side view of the subsurface emitter 10 is shown in FIG. 2. A piston 20 resides in the nozzle 12 and is inserted into an end 11a of the body 11 which preferably provides a seat feature for the piston 20. The piston 20 is preferably stepped and cylindrical, and a smaller diameter portion 20a enters the end 11a of the body 11 and a larger diameter portion 20b defining a circumferential surface 20b' (see FIG. 4). A downward facing piston seat 21 is defined by the step in the piston 20. A spring 22 resides in the nozzle 12 pushing the piston 20 against and into the end 11a of the body 11. The spring 22 and piston 20, and seat feature of the body 11, create a valve between an interior 13 of the emitter 10 and ceiling 12a of the nozzle 12.

Those skilled in the art will recognize that the seat feature of the body 11 may be the end 11a of the body 11, or a separate seat formed proximal to the end 11a of the body 11, and any seat formed on or attached to the body 11 for sealing cooperation with the piston 20 is intended to come within the scope of the present invention.

A cross-sectional view of the subsurface emitter 10 in a closed position taken along line 3-3 of FIG. 1B is shown in FIG. 3A. The body 11 has a center line CL. The piston 20 is shown pushed against the end 11a (see FIG. 2) of the body 11 preventing a backflow of water from the emitter 10 into a watering system 30. In the closed position, a surface portion the piston 20 further resides over the port 14 preventing roots from growing into the port 14 and blocking the spray of water 15 (see FIG. 3B) from the port 14.

A cross-sectional view of the subsurface emitter 10 in an open position taken along line 3-3 of FIG. 1B is shown in FIG. 3B. A flow of water 32a under pressure is provided to an interior 13 of the emitter 10 producing flows 34 to the nozzles 12 and 32b leaving the emitter 10. The flows 34 push the pistons 20 to an open position exposing the ports 14 to the flows 34 creating a spray 15 from the emitter 10.

The port 14 is generally perpendicular to the centerline CL and may have various shapes but preferably has about the same height and width, and more preferably has a round cross-section. The area of the port 14 is selected to provide a high velocity spray into the surrounding subsurface area 40 to dig through the soil to provide wide coverage. The ports 14 are preferably between 0.023 and 0.04 inches in diameter for general use and preferably between 0.035 and 0.04 inches in diameter for clay soil. The ports 14 are not necessarily round and may be a elliptical or polygonal with an equivalent cross-sectional area.

FIG. 4 shows a detailed view of a piston 20 of the subsurface emitter 10. The smaller diameter portion 20a had a diameter D3 and the larger diameter portion 20b has a diameter D4. The diameter D3 is smaller than the inside diameter D1 of the body 11 (see FIG. 3A) to allow water to flow between the piston 20 and the body end 11a when the piston is open and the diameter D4 is only slightly smaller than the inside diameter D2 of the nozzle 12. The diameter D1 is preferably about 0.8 inches and the diameter D3 is preferably about 0.7 inches, and more preferably, the diameter D3 is at least 0.1 inches less than the diameter D1 to allow a flow of water from the body interior into a nozzle interior 12c, and most preferably, the diameter D3 is at about 0.1 inches less than the diameter D1 to allow a flow of water from the body interior into the nozzle interior. The diameter D2 is preferably about 0.92 inches and the diameter D4 is preferably about 0.91 inches around the circumferential surface 20b'.

FIG. 4A shows a second embodiment of a piston 20' and spring 22'. The spring 22' resides partially inside a lengthened smaller diameter portion 20a of the piston 20', the smaller diameter portion 20a having a length L3 of about 0.46 inches. The larger diameter portion 20b includes a step reducing the diameter from a diameter D5 of preferably about 0.91 inches and length L1 of preferable about 0.08 inches to a diameter D6 of about 0.8 inches and length L2 of preferably about 0.08 inches. The reduced diameter D6 allows a better flow of water to the ports 14 when the piston 20' only moves slightly.

Figure 5A:
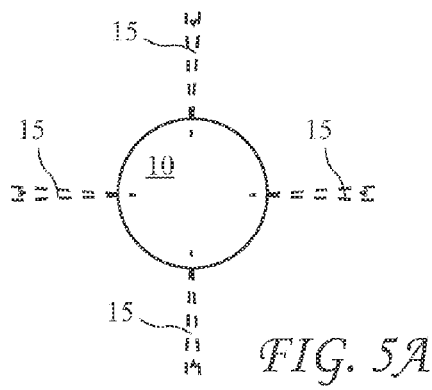
FIGS. 5A and 5B show a first embodiment of spray patterns of the subsurface emitter according to the present invention.
Figure 5B:
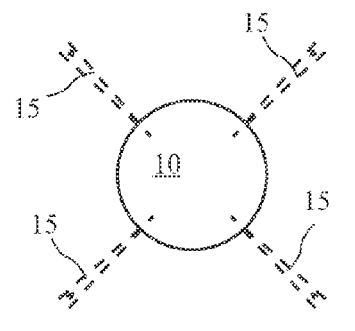

FIGS. 5A and 5B show a first embodiment of spray patterns of the subsurface emitter 10. The combined top and bottom nozzles 12 provide eight sprays of water 15 generally evenly angularly spaced, i.e., spaced 45 degrees apart for general use in an open area.

Figure 6A:
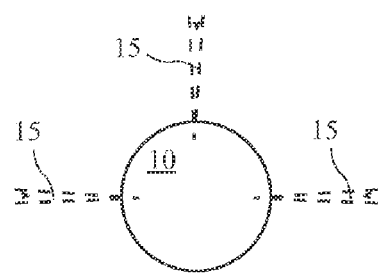
FIGS. 6A and 6B show a second embodiment of spray patterns of the subsurface emitter according to the present invention.
Figure 6B:
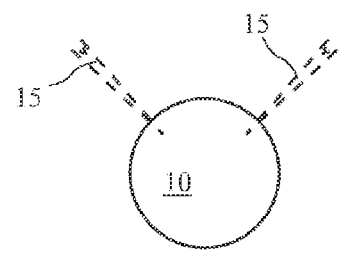
Figure 7A:
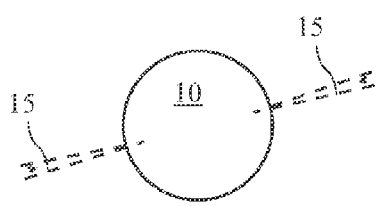
FIGS. 7A and 7B show a third embodiment of spray patterns of the subsurface emitter according to the present invention.
Figure 7B:
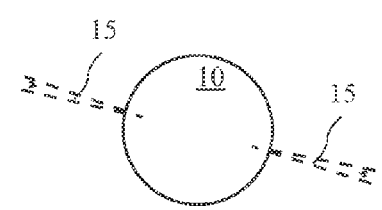

FIGS. 6A and 6B show a second embodiment of spray patterns of the subsurface emitter 10 suitable for a side spray pattern.

FIGS. 6A and 6B show a third embodiment of spray patterns of the subsurface emitter 10 suitable for a narrow pattern.

Figure 8:
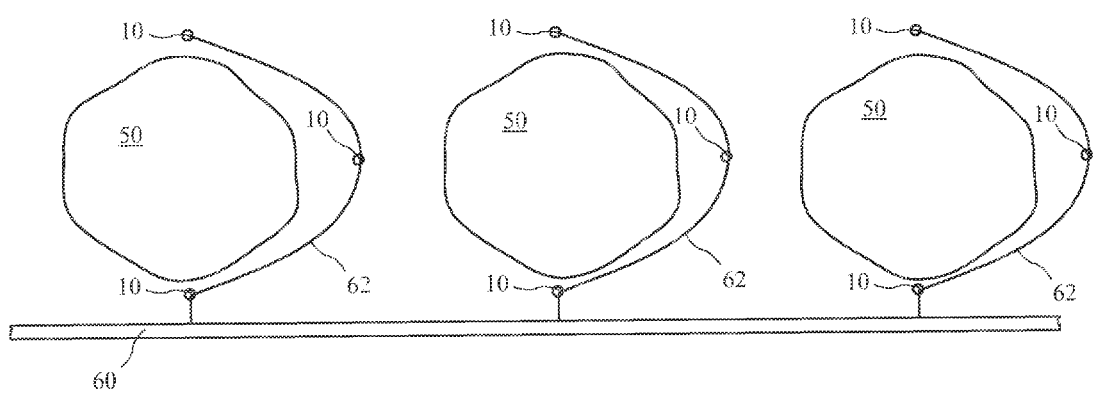
FIG. 8 shows a layout of the subsurface emitter according to the present invention.

FIG. 8 shows a layout of the emitters 10 for watering a row of trees. The emitters 10 are fed by, for example, a two inch main water line, and groups of three or four emitters 10 surround each tree 50, and up to six or eight emitters 10 for larger trees, and are fed in series by a half inch water line. Operating pressure is preferably between 20 and 80 Pounds per Square Inch (PSI) and more preferably 40 PSI. The emitters 10 are preferably five to eight feet from the tree and the top of the emitters 10 are preferably eight to twelve inches deep, and as much as 24 inches deep for some mature trees.

The body and nozzle are preferably made from plastic and the piston is made from flexible PVC or vinyl.

While the invention herein disclosed has been described by means of specific embodiments and applications thereof, numerous modifications and variations could be made thereto by those skilled in the art without departing from the scope of the invention set forth in the claims.

I claim:

1. A subsurface emitter comprising:
   a body having a centerline CL, a body interior, a top and a bottom opposite to the top;
   an inlet into the body interior, the inlet configured to connect to a watering system to place the body interior in fluid communication with the watering system;
   a nozzle attached to the top of the body and having a nozzle interior and a nozzle ceiling defining a closed end of the nozzle interior opposite to the body;
   at least one port in the nozzle providing fluid communication between the nozzle interior and a subsurface area adjacent to the nozzle;
   a piston residing in the nozzle interior, a cylindrical circumferential surface portion of the piston slides against an interior wall of the nozzle;
   a spring residing in compression between the nozzle ceiling and the piston biasing the piston towards the body;
   a closed piston position wherein the cylindrical circumferential surface portion of the piston covers the port and restricts the fluid communication through the port between the subsurface area and the nozzle interior; and
   an open piston position wherein the cylindrical circumferential surface portion of the piston no longer covers the port and fluid communication is open between the body interior the subsurface area adjacent to the nozzle.

2. The emitter of claim 1, wherein in the closed position, the piston is pressed against the body by the spring to block fluid communication between the body interior and the nozzle interior.

3. The emitter of claim 1, wherein:
   the piston includes a larger diameter portion defining the cylindrical circumferential surface portion and a smaller diameter portion entering the body;
   a piston seat is defined by a transition between the larger diameter portion from the smaller diameter portion; and
   the piston seat is pressed against the body by the spring, in the in the closed piston position, to block fluid communication between the body interior and the nozzle interior.

4. The emitter of claim 3 wherein the smaller diameter portion of the piston has a diameter D3 at least 0.1 inch less than an inside diameter D1 of the body.

5. The emitter of claim 3, wherein the piston seat is a step residing between the cylindrical circumferential surface portion and the smaller diameter portion, and perpendicular to a centerline CL of the emitter.

6. The emitter of claim 1, wherein the port has a diameter between 0.023 and 0.04 inches.

7. The emitter of claim 1, wherein the port is generally perpendicular to the centerline CL.

8. The emitter of claim 1, wherein the spring resides between a nozzle ceiling and the piston.

9. The emitter of claim 1, wherein the cylindrical circumferential surface portion of the piston slides axially parallel to a centerline CL of the emitter, against a portion of the interior wall of the nozzle parallel to the cylindrical circumferential surface portion, to cover and uncover the at least one port.

10. The emitter of claim 1, wherein:
the emitter has a centerline CL:
the cylindrical circumferential surface portion of the piston is cylindrical and radially symmetric about the centerline CL;
the nozzle interior is cylindrical and radially symmetric about the centerline CL; and
the piston is biased towards the body by the spring to position the cylindrical circumferential surface portion of the piston covering the ports in the closed piston position.

11. A subsurface emitter comprising:
a body having a centerline CL, a body interior, a top and a bottom opposite to the top;
an inlet into the body interior, the inlet configured to connect to a watering system to place the body interior in fluid communication with the watering system;
a nozzle attached to the top of the body and having a nozzle interior and a nozzle ceiling defining a closed end of the nozzle interior opposite to the body;
at least one port in the nozzle providing fluid communication between the nozzle interior and a subsurface area adjacent to the nozzle, the port having an area between 0.000414 and 0.00125 square inches;
a piston residing in the nozzle interior, a cylindrical circumferential surface portion of the piston slides against an interior wall of the nozzle;
a spring residing in compression between the nozzle ceiling and the piston biasing the piston towards the body;
a closed piston position wherein the cylindrical circumferential surface portion of the piston covers the port and restricts the fluid communication through the port between the subsurface area and the nozzle interior; and
an open piston position wherein the cylindrical circumferential surface portion of the piston no longer covers the port and fluid communication is open between the body interior the subsurface area adjacent to the nozzle.

12. The emitter of claim 11, wherein the piston includes a piston seat below the cylindrical circumferential surface portion, the piston seat is biased against an emitter body seat by the spring and restricts the fluid communication between the body interior and the nozzle interior.

13. The emitter of claim 12, wherein:
the piston includes a second portion below the piston seat, the second portion having a smaller horizontal cross-section than the first portion;
the emitter body seat resides proximal to a top of the emitter body; and
the second portion of the piston resides inside the emitter body in the closed position.

14. The emitter of claim 11, wherein;
the emitter includes a second nozzle opposite to the nozzle;
each nozzle includes four ports angularly spaced apart by 90 degrees; and the second nozzle is rotated 45 degrees with respect to the first nozzle providing 45 degree angular spacing between the ports.

15. The emitter of claim 11, further including an outlet configured to connect to the watering system to place the emitter interior in further fluid communication with the watering system.

16. The emitter of claim 11, wherein:
the emitter has a centerline CL:
the cylindrical circumferential surface portion of the piston is cylindrical and radially symmetric about the centerline CL;
the nozzle interior is cylindrical and radially symmetric about the centerline CL; and
the piston is biased towards the body by the spring to position the cylindrical circumferential surface portion of the piston covering the ports in the closed piston position.

17. A subsurface emitter comprising:
a body having a centerline CL, a body interior, a top and a bottom opposite to the top;
an inlet into the body interior, the inlet configured to connect to a watering system to place the body interior in fluid communication with the watering system;
a nozzle attached to the top of the body and having a nozzle interior and a nozzle ceiling defining a closed end of the nozzle interior opposite to the body;
a second nozzle attached to the bottom of the body and having a second nozzle interior and a second nozzle ceiling defining a second closed end of the second nozzle interior opposite to the body;
at least one port in the nozzle providing fluid communication between the nozzle interior and a subsurface area adjacent to the nozzle;
at least one second port in the second nozzle providing fluid communication between the second nozzle interior and a subsurface area adjacent to the second nozzle;
a piston residing in the nozzle interior, a cylindrical circumferential surface portion of the piston slides against an interior wall of the nozzle;
a second piston residing in the second nozzle interior, a second cylindrical circumferential surface portion of the second piston slides against a second interior wall of the second nozzle;
a spring residing in compression between the nozzle ceiling and the piston biasing the piston towards the body;
a second spring residing in compression between the second nozzle ceiling and the second piston biasing the second piston towards the body;
a closed piston position wherein the cylindrical circumferential surface portion of the piston covers the port and restricts the fluid communication through the port between the subsurface area and the nozzle interior;
a second closed piston position wherein the second cylindrical circumferential surface portion of the second piston covers the second port and restricts the fluid communication through the second port between the subsurface area and the second nozzle interior;
an open piston position wherein the cylindrical circumferential surface portion of the piston no longer covers the port and fluid communication is open between the body interior the subsurface area adjacent to the nozzle; and
a second open piston position wherein the second cylindrical circumferential surface portion of the second piston no longer covers the second port and fluid communication is open between the body interior the subsurface area adjacent to the second nozzle.

18. The emitter of claim 17, wherein the springs reside entirely in the nozzles between the piston and a nozzle ceilings opposite to the emitter body.

19. The emitter of claim 17, wherein the ports have a diameter between 0.023 and 0.04 inches.

20. The emitter of claim 17, wherein:
the emitter has a centerline CL:
the cylindrical circumferential surface portion of the pistons are cylindrical and radially symmetric about the centerline CL;
the nozzle interiors are cylindrical and radially symmetric about the centerline CL; and
the pistons are biased towards the body by the springs to position the cylindrical circumferential surface portion of the pistons covering the ports in the closed piston position.

* * * * *